United States Patent [19]
Crosthwait

[11] 3,798,630
[45] Mar. 19, 1974

[54] FISHING LINE MOTION SENSING ALARM

[76] Inventor: Lavurn Crosthwait, 1126 E. 28th, Anderson, Ind. 46014

[22] Filed: Aug. 30, 1972

[21] Appl. No.: 284,893

[52] U.S. Cl.................. 340/279, 340/283, 43/17, 200/61.13
[51] Int. Cl............................................ A01k 97/12
[58] Field of Search.......... 340/279, 282, 259, 283; 200/61.13, 61.14; 43/16, 17

[56] References Cited
UNITED STATES PATENTS

| | | |
|---|---|---|
| 2,869,275 | 1/1959 | Levin ...................................... 43/17 |
| 3,389,489 | 6/1968 | Burns ...................................... 43/17 |
| 3,470,647 | 10/1969 | Horner ...................................... 43/17 |
| 3,444,643 | 5/1969 | Dobbs ...................................... 43/17 |
| 2,785,494 | 3/1957 | Eaton ...................................... 43/17 |
| 3,199,241 | 8/1965 | Mauritz ...................................... 43/17 |

Primary Examiner—John W. Caldwell
Assistant Examiner—William M. Wannisky
Attorney, Agent, or Firm—Woodard, Weikart, Emhardt & Naughton

[57] ABSTRACT

A spring-loaded, clothespin-type clip is provided with a string clutching member movable by string movement to operate a switch mounted on the clip. The clip is securable to a mounting post on a box containing a power supply and speaker for energization of the speaker in response to string movement. A fishing rod can be mounted in or beside the clip, and the clip is mountable wherever there is a surface to which it can be clipped.

12 Claims, 3 Drawing Figures

PATENTED MAR 19 1974 3,798,630

FISHING LINE MOTION SENSING ALARM

BACKGROUND OF THE INVENTION

1. Field of the Invention

This invention relates generally to string motion sensing alarm apparatus, and more particularly to such apparatus having features for convenience of mounting and dismounting the sensing means.

2. Description of the Prior Art

A variety of devices is known in the art for responding to changes in string tension or other inputs to sound an alarm. Some of these which are more or less pertinent to fishing line activation and shown in patents are as follows:

| U.S. Pat. No. | | |
| --- | --- | --- |
| 2,446,427 | Linder | Aug. 3, 1948 |
| 2,574,333 | Kuczynski et al. | Nov. 6, 1951 |
| 2,869,275 | Levin | Jan. 20, 1959 |
| 2,978,828 | McQuiston et al. | Apr. 11, 1961 |
| 3,134,187 | Blakely | May 26, 1964 |
| 3,389,489 | Burns | June 25, 1968 |
| 3,470,647 | Horner | Oct. 7, 1969 |
| 3,618,068 | Sloan | Nov. 2, 1971 |

These are the most pertinent devices known to me. I believe something better is needed, particularly something more convenient to use and reliable in use. My present invention is intended to answer this need.

SUMMARY OF THE INVENTION

Described briefly in a typical embodiment of the present invention, there is an electric switch mount in a portion of a spring loaded gripper securable to a post, limb, or other structure. A switch actuator is movably mounted to the gripper means and operable on the switch, and has means for clutching a string therein for response to movement of the string to actuate the switch. An electrical conductor extends from the switch to a separate box which includes a power supply and an alarm device.

DESCRIPTION OF THE PREFERRED EMBODIMENT

Figure 1:
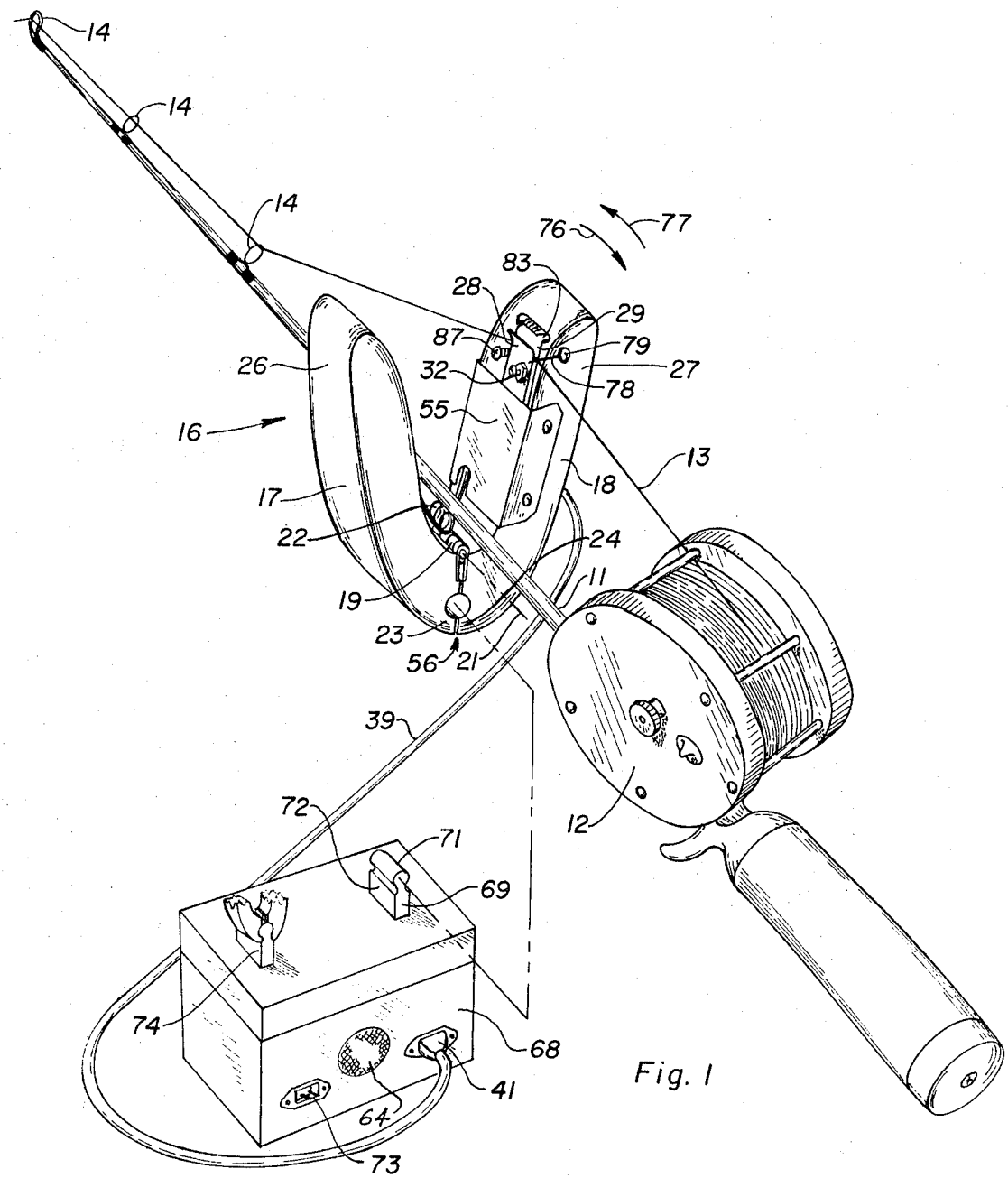
FIG. 1 is a perspective view of a typical embodiment of the present invention employed with a fishing rod and line.

Referring now to the drawings in detail, FIG. 1 shows a fishing rod 11 with reel 12 thereon and fishing line 13 extending from the reel through guides 14 on the rod. Gripper means for mounting the switch and actuator employed are shown in the form of a clothespin-clip 16 including gripper arms 17 and 18 mounted together by a piano-type hinge 19 for pivoting on an axis 21. The arms are spring loaded by means of the spring 22 so that the gripper portions of the two arms at 23 and 24 below the hinge are urged together, the manipulator portions 26 and 27 being thereby held apart so that they can be grasped in a hand and squeezed together to open the gripper portion for mounting and dismounting from a suitable support.

Figure 3:
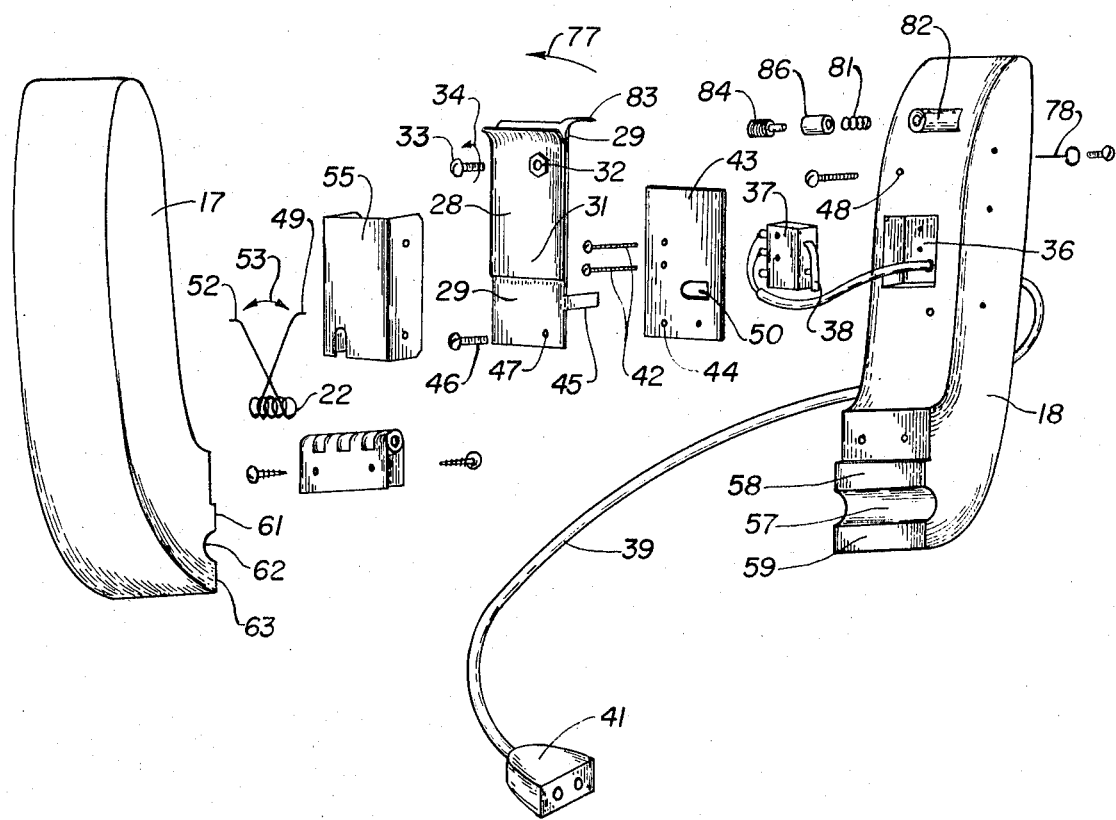
FIG. 3 is an exploded view of the switch mount and clip assembly.

There is a switch actuator pivotally mounted to the arm 18, this actuator including string clutching means formed by a pair of blades 28 and 29 secured together by soldering or welding, for example, at 31 as best shown in FIG. 3, and having upper marginal portions curving outward away from each other forming a notch or groove between the facing surfaces of the blades. A screw threaded member shown in the form of a nut 32 is affixed to the blade 28 and receives a screw 33 therethrough, the inner end of which engages the face of blade 29. By turning this screw in, the notch can be opened (the groove widened), while by turning the screw outward in the counterclockwise direction of arrow 34, the groove is narrowed. This adjustment facilitates the use of a significantly large range of string thicknesses.

As is best shown in FIG. 3, a pocket 36 is provided on the inner face of arm 18, facing toward the inside of the yoke formed by the two arms 17 and 18 in assembly. This pocket receives a small snap-action electric switch 37 having an operator arm 38 thereon and two electrical conductors extending therefrom through the cord 39 to a quick disconnect socket 41. The switch 37 is secured in the pocket by means of a pair of screws 42 received through the switch cover plate 43 and switch 37 and threadably received in the arm 18 itself. Additional screws may secure the cover plate 43 to the arm and one of these may be used in aperture 44. In addition, there is a screw 46 which passes through the cover plate 43 and is threadably received in the arm 18 but this does not clamp the cover plate 43 but only serves as a pivot post for the string-clutching switch actuator. Aperture 47 through actuator blade 29 is pivotally mounted to the pivot post screw 46. Tab 45 on blade 29 projects through hole 50 in switch cover plate 43 into pocket 36 for actuation of switch operator arm 38 when the actuator is pivoted in the direction of arrow 77 about post 46.

Further referring to FIG. 3, an aperture 48 is provided in the inner face of arm 18 and receives therein the tip 49 of the spring 22, the other tip 52 thereof being received in a similar aperture in the inner face of the arm 17. The actuator and a portion of spring 51 are covered by cover plate 55 secured to arm 18.

Spring 51 tends to unwind in the direction of arrows 53 to provide the spring gripping action in the gripping area 56 (FIG. 1) where, as is best shown in FIG. 3, there is a semi-cylindrical groove 57 with a planar surface 58 above it and another planar surface 59 below it. The arm 17 has corresponding facing surfaces at 61, 62, and 63. The spring force holds the gripper portions of the arms in contact within the gripper area. By the provision of not only a pair of generally flat surfaces on each of the arms, but also a semi-circular groove therebetween, the gripper portion is well adapted to mounting on a support having generally linear surface features or on a support having generally circular surface features, the former being boards, sheets, plates, or rails, for example, and the latter being rods, sticks, limbs, cables, or bars, for example.

Figure 2:
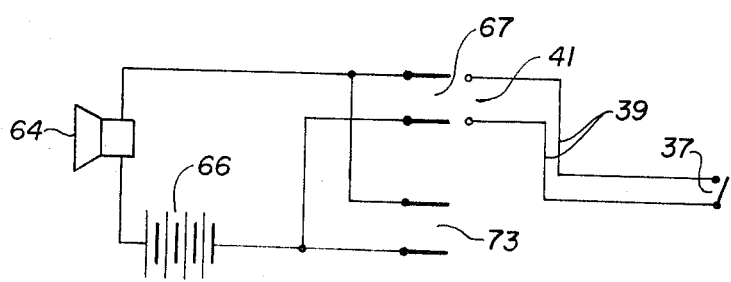
FIG. 2 is an electrical schematic diagram thereof.

As shown in FIG. 2, there is an alarm device which, in this embodiment, is shown as a loud speaker 64 connected to one side of a battery 66, the other sides of the alarm and battery being connected to terminals in a quick disconnect plug 67. These components are mounted in a housing 68 (FIG. 1), with the socket 41 being connected to the plug 67, the latter being immediately inside the face of the housing.

There is a post 69 atop the housing and it is formed to provide a combination semi-cylindrical rib 71 and flat faces 72 therebelow. This post serves as a convenient support upon which the gripper can be clipped, it desired. Another post of identical configuration is also provided for another clip, and a plug is provided at 73 for another sensing device to be electrically connected thereto and the clip for which can be mounted to the post 74.

In view of the fact that the pivot screw 46 for the actuator is mounted on an axis generally perpendicular to the plane containing the hinge axis 21 and which lies between the gripping surfaces of the two arms, it can be recognized that the string clutching portion of the actuator is movable back and forth in the direction of arrows 76 and 77, respectively, in a direction generally parallel to the hinge axis 21. The actuator is normally held against a stop rod 78 affixed to the arm 18 by a screw 79 received through a loop in the stop rod. The actuator is so held by means of a coil spring 81 received in a pocket 82 in the inner face of arm 18, this spring bearing against a tab 83 on blade 29, the other end of the spring bearing on a shoulder on adjustment screw 84 threadedly received in a bushing 86 which is pressed into the arm 18. Accordingly the actuator is urged rearwardly in the direction of arrow 76 by the spring 81, but can be moved about its pivot 46 forward in the direction of arrow 77 into abutment against the stop screw 87 which is also threadedly received in the arm 18.

While it will be recognized that the present invention has a number of possible uses, perhaps its use in connection with fishing will be of most interest. For this purpose, the housing or box 68 can be placed almost anywhere that the person using it will be able to hear the alarm when actuated, or see it in the event a light is used instead of a speaker or bell or other anunciator. The clip assembly can be located wherever it will be convenient with reference to the fishing rod. For example, it can be clamped on the box, or on a boat, tree branch, root, or virtually any place. Then the fisherman casts the bait and, when satisfied with its position, lays the fishing pole in the apex of the yoke formed by the arms of the clip, or beside the clip. The fishing line is placed in the groove between the blades 28 and 29. It is desirable to have the string wedged sufficiently that the actuator will be pivoted in the direction of arrow 77 when a fish strikes, to operate the switch 37, and then commence sliding in the clutch as the fish takes the line out, and at the same time maintaining the switch closed condition to continue to energize the alarm. Depending on the size and type of fishing line, and adjustment of the adjusting screw 33 may be needed for obtaining this type of performance.

Occasionally there is a fairly considerable current in a stream being fished. In this instance it may be necessary to turn the water current compensating adjusting screw 84 inwardly so that the alarm is not actuated by the current alone. It will probably be recognized that for most conditions a given adjustment of both screws 84 and 33 will suffice. When the fish strikes, and the fisherman raises the rod sharply from its rest, the line will come out readily from the clutching means by virtue of the groove therein opening outwardly away from the apex of the yoke.

The invention claimed is:

1. A string motion sensing alarm apparatus comprising:

a switch mount including clothespin-type gripper means for gripping a support for the switch mount;

first switch means on said mount, and a switch actuator movably connected to said mount and to said switch means, said actuator having string clutching means movably mounted on said mount, and movable thereon responsive to movement of a string therein lengthwise of the string to move said actuator and operate said switch means.

2. The apparatus of claim 1 wherein:

said gripper means include first and second gripper arms hinged together to provide a gripper portion and a manipulator portion, the manipulator portion extending a greater distance from the hinge axis than the gripper portion; and said gripper means further include resilient means biasing said arms to close said gripper portion and open said manipulator portion and of sufficient strength to hold the switch mount on a support in an orientation such that the switch means, and switch actuator are above the support, exclusive of any other means to maintain such orientation.

3. The apparatus of claim 2 wherein:

said switch actuator is located between the gripper arms at the manipulator portion of said gripper means to receive a string extending through the space between the gripper arms at the manipulator portion of the gripper means.

4. The apparatus of claim 2 wherein:

said switch means include a switch received in a cavity in one of said gripper arms at the manipulator portion of one of said gripper means.

5. The apparatus of claim 2 wherein:

said gripper portion has gripper surfaces defining a gripping area, said actuator is pivotable on an axis generally perpendicular to a plane which contains the hinge axis and lies between the gripper surface of the respective arms, said string clutching means of said actuator being remote from the pivot axis of said actuator and movable in a direction generally parallel to said hinge axis.

6. The apparatus of claim 2 wherein:

said string clutching means include a notch which opens in a direction away from the hinge axis of said gripper arms.

7. The apparatus of claim 6 wherein:

said clutching means includes a pair of blades having generally parallel facing surfaces to receive the string therebetween, said notch being a groove formed by said facing surfaces, and said blades having adjustment means thereon to adjust the spacing between said blades and thereby adjust the width of said groove.

8. The apparatus of claim 7 wherein:

the portions of said gripper arms in the manipulator portion of the gripper means cooperate to form a yoke for loosely receiving and supporting a fishing rod therebetween, said string clutching means being disposed between the yoke forming portions of said gripper arms and away from the apex of said yoke.

9. The apparatus of claim 2 and further comprising:

a housing;
an alarm device in said housing;
a source of electrical energy;
said switch means including a first switch in a circuit including said source and said alarm device;
a rib projecting from said housing;
said gripper portion gripping said rib, and supporting said switch mount on said housing.

10. The apparatus of claim 9 wherein:
said circuit includes a length of conductor extending from said switch through a quick disconnect socket and plug assembly to said source and alarm device, said conductor being sufficiently long to accommodate removal of said mount from said housing by gripping and squeezing the manipulator portion of said arms, and movement of said mount away from said housing while said conductor remains connected to said switch and to said source and alarm device through said quick disconnect assembly.

11. The apparatus of claim 10 wherein:
said gripper arms at the said manipulator portion form an upwardly opening yoke, when the gripper portion is in an assembled operative position gripping said rib,
said clutching means including a notch opening upwardly above the bottom of the yoke, when the yoke is in its upwardly opening position,
the apparatus further comprising a fishing rod resting on the bottom of the yoke and having a reel thereon and having fishing line extending from said reel and clutched in said clutching means and operable to move said clutching means and thereby said actuator to operate said switch as said fishing line moves lengthwise.

12. The apparatus of claim 11 and further comprising:
second resilient means urging said string clutching means toward said reel;
said fishing line being wedged in said notch with sufficient tightness to move said clutching means and thereby said actuator against the force of said second resilient means to actuate said switch means before commencement of slippage of said fishing line through said notch.

\* \* \* \* \*